(12) United States Patent
Narang et al.

(10) Patent No.: US 12,386,679 B2
(45) Date of Patent: Aug. 12, 2025

(54) LEVERAGING MACHINE LEARNING TO AUTOMATE CAPACITY RESERVATIONS FOR APPLICATION FAILOVER ON CLOUD

(71) Applicant: Capital One Services, LLC, McLean, VA (US)

(72) Inventors: Sunil Narang, Glen Allen, VA (US); Jean Muskatel, Bethesda, MD (US); Kathleen Poeter, Richmond, VA (US); Nicholas Bhaskar, Carnegie, PA (US); Nazia Sarang, Henrico, VA (US)

(73) Assignee: Capital One Services, LLC, McLean, VA (US)

( * ) Notice: Subject to any disclaimer, the term of this patent is extended or adjusted under 35 U.S.C. 154(b) by 604 days.

(21) Appl. No.: 17/543,938

(22) Filed: Dec. 7, 2021

(65) Prior Publication Data

US 2023/0177411 A1    Jun. 8, 2023

(51) Int. Cl.
    *G06F 9/50*        (2006.01)
(52) U.S. Cl.
    CPC ............. *G06F 9/5088* (2013.01); *G06F 9/50* (2013.01); *G06F 9/5072* (2013.01)
(58) Field of Classification Search
    CPC ......... G06F 9/5088; G06F 9/50; G06F 9/5072
    See application file for complete search history.

(56) References Cited

U.S. PATENT DOCUMENTS

| | | | |
|---|---|---|---|
| 9,128,899 B1 * | 9/2015 | McAlister | G06F 9/505 |
| 9,208,032 B1 * | 12/2015 | McAlister | G06Q 40/04 |
| 10,152,449 B1 | 12/2018 | Ward, Jr. | |
| 10,713,129 B1 * | 7/2020 | Tummala | G06F 11/1458 |
| 10,817,506 B2 * | 10/2020 | Shukla | G06F 16/903 |
| 10,942,795 B1 * | 3/2021 | Yanacek | G06F 9/5066 |
| 10,990,501 B2 | 4/2021 | Desai et al. | |
| 11,068,162 B1 | 7/2021 | Meister et al. | |
| 11,106,551 B1 * | 8/2021 | Featonby | G06F 11/2023 |
| 2005/0273645 A1 * | 12/2005 | Satran | G06F 11/2028 714/4.1 |
| 2012/0079497 A1 * | 3/2012 | Gangemi | G06F 9/5011 718/104 |
| 2013/0212422 A1 * | 8/2013 | Bauer | H04L 43/0805 714/57 |
| 2015/0149813 A1 * | 5/2015 | Mizuno | G06F 11/1484 714/4.11 |
| 2016/0301624 A1 * | 10/2016 | Gonzalez | G06F 9/5083 |
| 2017/0090990 A1 * | 3/2017 | Furman | G06F 9/5061 |
| 2018/0165166 A1 * | 6/2018 | Wang | G06F 11/2033 |

(Continued)

*Primary Examiner* — Benjamin C Wu
(74) *Attorney, Agent, or Firm* — Sterne, Kessler, Goldstein & Fox P.L.L.C.

(57) ABSTRACT

Embodiments disclosed are directed to a computing system that performs operations for leveraging machine learning to automate capacity reservations for application failover in a cloud-based computing system. The computing system determines a simulated usage capacity of a set of applications executing in a first zone of a cloud-based computing system. The computing system then determines an amount of cloud-based computing instances in a second zone of the cloud-based computing system needed to maintain the simulated usage capacity in an event of a failover of the first zone. Subsequently, the computing system reserves the amount of cloud-based computing instances in the second zone.

15 Claims, 6 Drawing Sheets

(56) References Cited

U.S. PATENT DOCUMENTS

| | | | |
|---|---|---|---|
| 2018/0199239 A1* | 7/2018 | Sabater Maroto | G06F 9/5072 |
| 2020/0310394 A1* | 10/2020 | Wouhaybi | H04L 67/1051 |
| 2020/0311573 A1* | 10/2020 | Desai | H04L 67/303 |
| 2021/0064431 A1* | 3/2021 | Smith | G06F 9/5077 |
| 2021/0135951 A1* | 5/2021 | Goudarzi | G06F 11/3447 |
| 2021/0144517 A1* | 5/2021 | Guim Bernat | H04L 47/781 |
| 2021/0160191 A1* | 5/2021 | Ghosh | H04L 47/83 |
| 2021/0263667 A1 | 8/2021 | Whitlock et al. | |
| 2021/0357255 A1* | 11/2021 | Mahadik | G06F 11/3006 |
| 2021/0365291 A1* | 11/2021 | Saha | G06N 5/04 |
| 2022/0164235 A1* | 5/2022 | Zuzga | G06F 9/5027 |
| 2022/0335317 A1* | 10/2022 | Segner | G06N 20/00 |
| 2022/0383324 A1* | 12/2022 | Sheshadri | H04L 41/16 |
| 2023/0168929 A1* | 6/2023 | Wadekar | G06F 9/5005 |
| | | | 718/104 |
| 2023/0180017 A1* | 6/2023 | Gadalin | H04W 16/22 |
| | | | 370/328 |
| 2024/0386354 A1* | 11/2024 | Sethi | G06Q 10/06375 |

\* cited by examiner

LEVERAGING MACHINE LEARNING TO AUTOMATE CAPACITY RESERVATIONS FOR APPLICATION FAILOVER ON CLOUD

TECHNICAL FIELD

Embodiments relate to entity integration, specifically a system that leverages machine learning to automate capacity reservations for application failover in a cloud-based computing system.

BACKGROUND

Typically, capacity reservations for cloud-based computing instances are created manually, resulting in many mismatches compared to an enterprise's fleet of cloud-based computing instances. For instance, manual reservations involve the laborious task of altering one reservation at a time, which is subject to human errors and spans multiple days when the enterprise has thousands of reservations in its fleet. This ad-hoc approach is risky to the enterprise and may result in the unavailability of instances during an application failover.

BRIEF DESCRIPTION OF THE DRAWINGS

The accompanying drawings, which are incorporated herein and form a part of the specification, illustrate embodiments of the present disclosure and, together with the description, further serve to explain the principles of the disclosure and to enable a person skilled in the art to make and use the embodiments.

DETAILED DESCRIPTION

Figure 1:
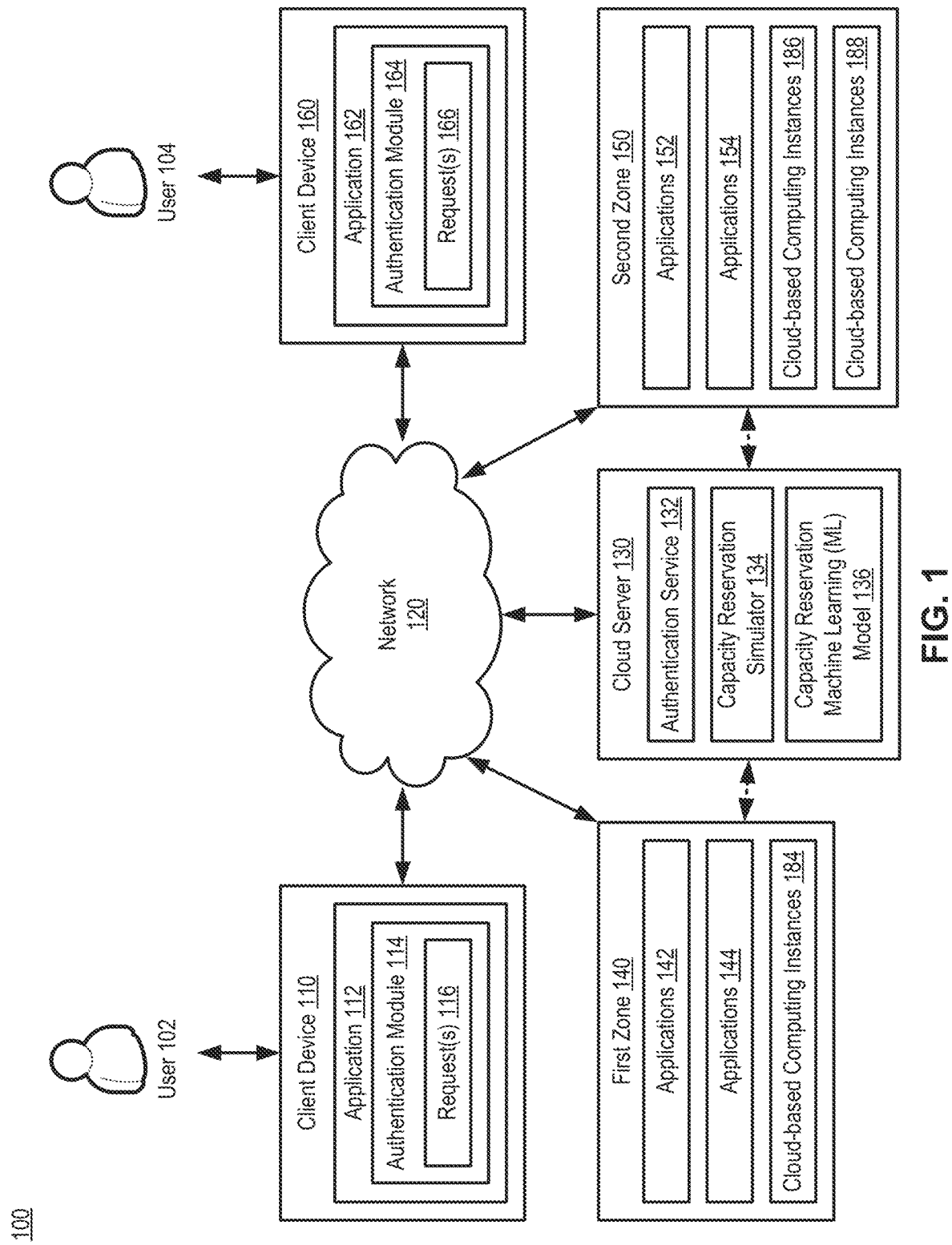
FIG. 1 illustrates an example system for leveraging machine learning to automate capacity reservations for application failover in a cloud-based computing system according to several embodiments.

Embodiments disclosed herein relate to systems and methods for entity integration. The systems and methods disclosed herein can achieve dynamic capacity reservations of cloud-based computing instances by utilizing a capacity reservation machine learning (ML) model to automate capacity reservations for application failover in a cloud-based computing system.

In several embodiments, the present disclosure provides for a capacity reservation ML model that uses a capacity reservation linear regression technique to determine the capacity reservations required for application failover on the cloud. The capacity reservation ML model performs the data analysis on the current fleet of cloud-based computing instances, observing the trends of the various instance types in all of the cloud-based accounts and availability zones to make an estimate of the amount of needed capacity reservations. The estimate and other data provided by the capacity reservation ML model is then enriched and fed into an automation workflow to modify and align the capacity reservations.

In one illustrative and non-limiting example, the capacity reservation ML model leverages a capacity reservation service and helps visualize the effects of its modifications against the instances running over a period of 7 days, 30 days, and 60 days. In practice, the capacity reservation ML model has resulted in expanding the coverage from about 6% to about 80% and improving the utilization of the capacity reservations from about 8% to about 99% for the applications running in the cloud. Additionally, the capacity reservation ML model actively mitigates the risk associated with a potential disaster recovery event while minimizing the cost impacts to the enterprise.

The following embodiments are described in sufficient detail to enable those skilled in the art to make and use the disclosure. It is to be understood that other embodiments are evident based on the present disclosure, and that system, process, or mechanical changes can be made without departing from the scope of an embodiment of the present disclosure.

In the following description, numerous specific details are given to provide a thorough understanding of the disclosure. However, it will be apparent that the disclosure can be practiced without these specific details. In order to avoid obscuring an embodiment of the present disclosure, some circuits, system configurations, architectures, and process steps are not disclosed in detail.

The drawings showing embodiments of the system are semi-diagrammatic, and not to scale. Some of the dimensions are for the clarity of presentation and are shown exaggerated in the drawing figures. Similarly, although the views in the drawings are for ease of description and generally show similar orientations, this depiction in the figures is arbitrary for the most part. Generally, the disclosure can be operated in any orientation.

The term "module" or "unit" referred to herein can include software, hardware, or a combination thereof in an embodiment of the present disclosure in accordance with the context in which the term is used. For example, the software can be machine code, firmware, embedded code, or application software. Also for example, the hardware can be circuitry, a processor, a special purpose computer, an integrated circuit, integrated circuit cores, or a combination thereof. Further, if a module or unit is written in the system or apparatus claim section below, the module or unit is deemed to include hardware circuitry for the purposes and the scope of the system or apparatus claims.

The term "service" or "services" referred to herein can include a collection of modules or units. A collection of modules or units can be arranged, for example, in software or hardware libraries or development kits in embodiments of the present disclosure in accordance with the context in which the term is used. For example, the software or hardware libraries and development kits can be a suite of data and programming code, for example pre-written code, classes, routines, procedures, scripts, configuration data, or a combination thereof, that can be called directly or through an application programming interface (API) to facilitate the execution of functions of the system.

The modules, units, or services in the following description of the embodiments can be coupled to one another as described or as shown. The coupling can be direct or indirect, without or with intervening items between coupled modules, units, or services. The coupling can be by physical contact or by communication between modules, units, or services.

FIG. 1 shows a system 100 for entity integration according to some embodiments. In several embodiments, system 100 can include a client device 110 associated with a user 102, a client device 160 associated with a user 104, a network 120, a cloud server 130, a first zone 140 including cloud-based computing instances 184 for executing applications 142 and applications 144, and a second zone 150 including cloud-based computing instances 186 and cloud-based computing instances 188 for executing applications 152 and applications 154. In several embodiments, the client device 110 can further include an application 112 which, in several embodiments, includes an authentication module 114 having access to a plurality of device attributes stored on, or in association with, the client device 110. In several embodiments, the client device 160 can further include an application 162 which, in several embodiments, includes an authentication module 164 having access to a plurality of device attributes stored on, or in association with, the client device 160. In several embodiments, the cloud server 130 can further include an authentication service 132, a capacity reservation simulator 134, and a capacity reservation ML model 136.

The client device 110 and the client device 160 can be any of a variety of centralized or decentralized computing devices. For example, one or both of the client device 110 and the client device 160 can be a mobile device, a laptop computer, a desktop computer, or a point-of-sale (POS) device. In several embodiments, one or both of the client device 110 and the client device 160 can function as a stand-alone device separate from other devices of the system 100. The term "stand-alone" can refer to a device being able to work and operate independently of other devices. In several embodiments, the client device 110 and the client device 160 can store and execute the application 112 and the application 162, respectively.

Each of the application 112 and the application 162 can refer to a discrete software that provides some specific functionality. For example, the application 112 can be a mobile application that allows the user 102 to perform some functionality, whereas the application 162 can be a mobile application that allows the user 104 to perform some functionality. The functionality can, for example and without limitation, allow the user 102, the user 104, or both to perform cloud-based application management operations (e.g., dynamically reserving cloud-based computing instances), banking, data transfers, or commercial transactions. In other embodiments, one or more of the application 112 and the application 162 can be a desktop application that allows the user 102 or the user 104 to perform these functionalities.

In several embodiments, the client device 110 and the client device 160 can be coupled to the cloud server 130 via a network 120. The cloud server 130 can be part of a backend computing infrastructure, including a server infrastructure of a company or institution, to which the application 112 and the application 162 belong. Although the cloud server 130 is described and shown as a single component in FIG. 1, in some embodiments, the cloud server 130 can comprise a variety of centralized or decentralized computing devices. For example, the cloud server 130 can include a mobile device, a laptop computer, a desktop computer, grid-computing resources, a virtualized computing resource, cloud computing resources, cloud-computing instances, peer-to-peer distributed computing devices, a server farm, or a combination thereof. The cloud server 130 can be centralized in a single room, distributed across different rooms, distributed across different geographical locations, or embedded within the network 120. While the devices comprising the cloud server 130 can couple with the network 120 to communicate with the client device 110 and the client device 160, the devices of the cloud server 130 can also function as stand-alone devices separate from other devices of the system 100.

In several embodiments, if the cloud server 130 can be implemented using cloud computing resources of a public or private cloud-based computing system or "cloud." Examples of a public cloud include, without limitation, Amazon Web Services (AWS)™, IBM Cloud™, Oracle Cloud Solutions™, Microsoft Azure Cloud™, and Google Cloud™. A private cloud refers to a cloud environment similar to a public cloud with the exception that it is operated solely for a single organization.

In several embodiments, the cloud server 130 can couple to the client device 110 to allow the application 112 to function. For example, in several embodiments, both the client device 110 and the cloud server 130 can have at least a portion of the application 112 installed thereon as instructions on a non-transitory computer readable medium. The client device 110 and the cloud server 130 can both execute portions of the application 112 using client-server architectures, to allow the application 112 to function.

In several embodiments, the cloud server 130 can couple to the client device 160 to allow the application 162 to function. For example, in several embodiments, both the client device 160 and the cloud server 130 can have at least a portion of the application 162 installed thereon as instructions on a non-transitory computer readable medium. The client device 160 and the cloud server 130 can both execute portions of the application 162 using client-server architectures, to allow the application 162 to function.

In several embodiments, the cloud server 130 can transmit requests and other data to, and receive requests, indications, device attributes, and other data from, the authentication module 114 and the authentication module 164 (and in effect the client device 110 and the client device 160, respectively) via the network 120. The network 120 refers to a telecommunications network, such as a wired or wireless network. The network 120 can span and represent a variety of networks and network topologies. For example, the network 120 can include wireless communications, wired communications, optical communications, ultrasonic communications, or a combination thereof. For example, satellite communications, cellular communications, Bluetooth, Infrared Data Association standard (IrDA), wireless fidelity (Wi-Fi), and worldwide interoperability for microwave access (WiMAX) are examples of wireless communications that can be included in the network 120. Cable, Ethernet, digital subscriber line (DSL), fiber optic lines, fiber to the home (FTTH), and plain old telephone service (POTS) are examples of wired communications that can be included in the network 120. Further, the network 120 can traverse a number of topologies and distances. For example, the network 120 can include a direct connection, personal area network (PAN), local area network (LAN), metropolitan area network (MAN), wide area network (WAN), or a combination thereof. For illustrative purposes, in the embodiment of FIG. 1, the system 100 is shown with the client device 110, the client device 160, and the cloud server 130 as end points of the network 120. This, however, is an example and it is to be understood that the system 100 can have a different partition between the client device 110, the client device 160, the cloud server 130, and the network 120. For example, the client device 110, the client device 160, and the cloud server 130 can also function as part of the network 120.

In several embodiments, the client device 110 and the client device 160 can include at least the authentication module 114 and the authentication module 164, respectively. In several embodiments, each of the authentication module 114 and the authentication module 164 can be a module of the application 112 and the application 162, respectively. In several embodiments, the authentication module 114 and the authentication module 164 can enable the client device 110 and the client device 160, respectively, and/or the application 112 and the application 162, respectively, to receive requests and other data from, and transmit requests, device attributes, indications, and other data to, the authentication service 132, the capacity reservation simulator 134, the capacity reservation ML model 136, and/or the cloud server 130 via the network 120. In several embodiments, this can be done by having the authentication module 114 and the authentication module 164 couple to the authentication service 132 via an API to transmit and receive data as a variable or parameter.

In several embodiments, the cloud server 130 can include at least the authentication service 132, the capacity reservation simulator 134, and the capacity reservation ML model 136. In several embodiments, each of the authentication service 132, the capacity reservation simulator 134, and the capacity reservation ML model 136 can be implemented as a software application on the cloud server 130. In several embodiments, the authentication service 132 can enable receipt of electronic information (e.g., device attributes, online account properties) from the authentication module 114 and the authentication module 164. This can be done, for example, by having the authentication service 132 couple to the authentication module 114 and the authentication module 164 via a respective API to receive the electronic information as a variable or parameter. In several embodiments, the authentication service 132 can further enable storage of the electronic information in a local storage device or transmission (e.g., directly, or indirectly via the network 120) of the electronic information to the first zone 140, the second zone 150, or both for storage and retrieval.

The first zone 140 of the cloud-based computing system can be a first zone (e.g., availability zone, local zone, wavelength zone, outpost, etc.) having cloud-based computing instances 184 located in a first region (e.g., a geographic region such as the U.S. Eastern region). The cloud server 130 can launch cloud-based computing instances 184 in the first zone 140 to provide for the execution of applications 142 and applications 144.

The second zone 150 of the cloud-based computing system can be a second zone (e.g., a different availability zone, local zone, wavelength zone, outpost, etc.) having cloud-based computing instances 184 and cloud-based computing instances 186 located in a second region (e.g., a different geographic region such as the U.S. Western region). The second zone 150 may not overlap geographically with any portion of the first zone 140. The cloud server 130 can reserve cloud-based computing instances 186 in the second zone 150 to provide for the execution of applications 152 and applications 154 in the event of a failover of the first zone 140. For example, applications 142 can be executing on the cloud-based computing instances 184 in the first zone 140, and, if the cloud-based computing instances 184 fail, the cloud-based computing instances 186 in the second zone 150 can handle requests for the applications 142 (e.g., the applications 142 can, in effect, become the applications 152 executing on the cloud-based computing instances 184 in the second zone 150).

In several embodiments, the capacity reservation ML model 136 can use a capacity reservation linear regression technique to determine the capacity reservations required for application failover on the cloud. The capacity reservation ML model 136 can perform the data analysis on the current fleet of cloud-based computing instances, observing the trends of the various instance types in all of the cloud-based accounts and availability zones to estimate the amount of capacity reservations needed to protect the system 100 from the impact of a catastrophic failure, such as a power loss, within the first zone 140. The capacity reservation simulator 134 can enrich the estimate and other data provided by the capacity reservation ML model 136 and feed that data into an automation workflow to modify and align the capacity reservations. Additionally, the capacity reservation simulator 134 can leverage a capacity reservation service of the cloud-based computing system and generate visualizations that illustrate the effects of modifications against the cloud-based computing instances 184 running in the first zone 140 over a period of 7 days, 30 days, and 60 days.

In a variety of embodiments, the cloud server 130, using the capacity reservation simulator 134 and the capacity reservation ML model 136, can provide for leveraging machine learning to automate capacity reservations for application failover in the cloud-based computing system (e.g., AWS™, IBM Cloud™, Oracle Cloud Solutions™, Microsoft Azure Cloud™, Google Cloud™, etc.).

In one illustrative example, the capacity reservation simulator 134 begins by determining (e.g., using the capacity reservation ML model 136) a simulated usage capacity of the applications 142 executed in the first zone 140 of the cloud-based computing system. In one example, to determine the simulated usage capacity, the capacity reservation simulator 134 determines an amount of cloud-based computing instances 184 used by the applications 142 in the first zone 140 over predetermined durations of time (e.g., last hour, day, week, month, year, etc.). The capacity reservation simulator 134 then determines a set of instance types, a set of computing platforms, and a set of availability zones (e.g., multiple availability zones in one or more regions different from the first region associated with the first zone 140) of the amount of cloud-based computing instances 184. Subsequently, the capacity reservation simulator 134 determines (e.g., using the capacity reservation ML model 136) the simulated usage capacity based on the amount of cloud-based computing instances 184, the set of instance types, the set of computing platforms, and the set of availability zones.

Continuing the example, the capacity reservation simulator 134 determines (e.g., using the capacity reservation ML model 136) an amount of cloud-based computing instances 186 in the second zone 150 of the cloud-based computing system needed to maintain the simulated usage capacity in the event of a failover of the first zone 140. Subsequently, the cloud server 130 reserves the amount of cloud-based computing instances 186 in the second zone 150. For example, to reserve the amount of cloud-based computing instances 186, the cloud server 130 generates a capacity reservation request to reserve the amount of cloud-based computing instances 186 in the second zone 150 and transmits the request to a capacity reservation service of the cloud-based computing system.

In several embodiments, the capacity reservation simulator 134 determines (e.g., using the capacity reservation ML model 136) the simulated usage capacity of the applications 142 executing in the first zone 140 at a first time. The capacity reservation simulator 134 also determines (e.g., using the capacity reservation ML model 136) a second simulated usage capacity of the applications 144 executing in the first zone 140 at a second time later than the first time. The capacity reservation simulator 134 then determines (e.g., using the capacity reservation ML model 136) an amount of cloud-based computing instances 188 in the second zone 150 needed to maintain the first simulated usage capacity and the second simulated usage capacity in the event of the failover of the first zone 140. The amount of cloud-based computing instances 188 can be less than the amount of cloud-based computing instances 186. Subsequently, the cloud server 130 reserves the second amount of cloud-based computing instances 188 in the second zone 150.

In some aspects, system 100 described above significantly improves the state of the art from previous systems because it provides enhanced techniques for leveraging machine learning to automate capacity reservations for application failover in a cloud-based computing system. As a result, the amount of capacity reservations for application failover can be reduced substantially to more closely resemble the amount that is likely to be needed, substantially eliminating the reservation costs associated with unused reservations. Additionally, these capacity reservations are created automatically using machine learning techniques, resulting in fewer mismatches compared to an enterprise's fleet of cloud-based computing instances and reducing the errors, time, and system labor associated with altering thousands of capacity reservations at a time.

Figure 2:
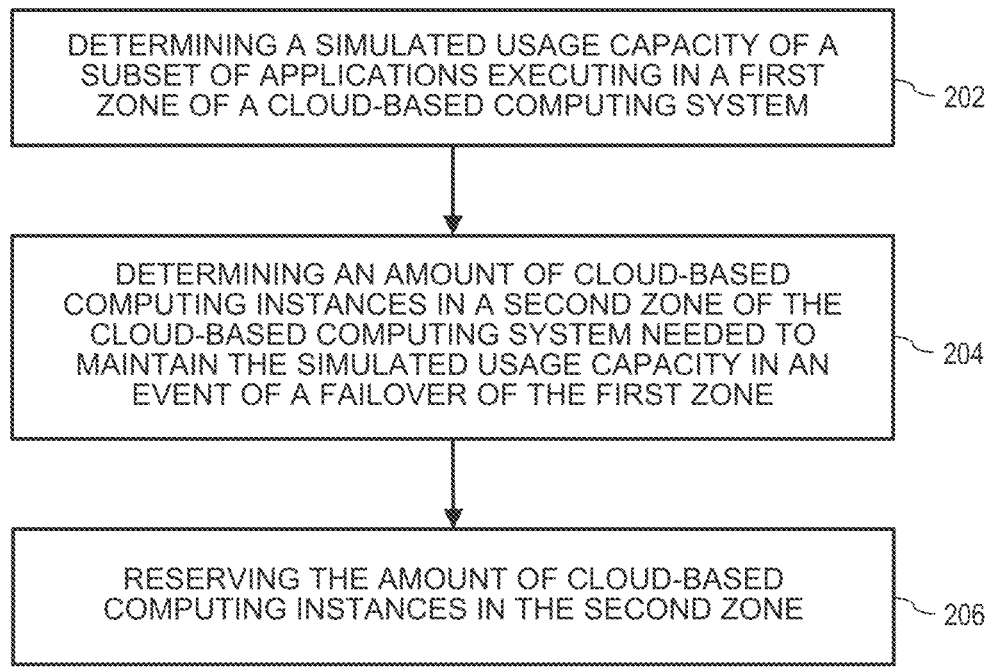
FIG. 2 illustrates an example method for leveraging machine learning to automate capacity reservations for application failover in a cloud-based computing system according to several embodiments.

FIG. 2 illustrates a method 200 of operating the system 100 to provide for leveraging machine learning to automate capacity reservations for application failover in a cloud-based computing system according to some embodiments. For example, method 200 indicates how the cloud server 130 operates (e.g., using the capacity reservation simulator 134 and the capacity reservation ML model 136). The cloud-based computing system can include, for example, AWS™, IBM Cloud™, Oracle Cloud Solutions™, Microsoft Azure Cloud™ Google Cloud™, any other suitable public or private cloud-based computing system, or any combination thereof.

In several embodiments, operation 202 operates to allow the cloud server 130 to determine a simulated usage capacity of a set of applications (e.g., applications 142) executed in a first zone 140 of a cloud-based computing system. In several embodiments, to determine the simulated usage capacity at operation 202, the cloud server 130 can determine an amount of cloud-based computing instances 184 used by the set of applications in the first zone over a plurality of predetermined durations of time. The cloud server 130 can further determine a set of instance types of the amount of cloud-based computing instances 184. The cloud server 130 can further determine a set of computing platforms of the amount of cloud-based computing instances 184. The cloud server 130 can further determine a set of availability zones of the amount of cloud-based computing instances 184. The cloud server 130 can further determine the simulated usage capacity based on the amount of cloud-based computing instances 184, the set of instance types, the set of computing platforms, and the set of availability zones.

In several embodiments, operation 204 operates to allow the cloud server 130 to determine an amount of cloud-based computing instances 186 in a second zone 150 of the cloud-based computing system needed to maintain the simulated usage capacity in an event of a failover of the first zone 140. In several embodiments, the first zone 140 can be distributed across a first geographic region (e.g., U.S. East (Northern Virginia) region "us-east-1"), and the second zone 150 can be distributed across a second geographic region (e.g., U.S. West (Northern California) region "us-west-1") different from the first geographic region.

In several embodiments, operation 206 operates to allow the cloud server 130 to reserve the amount of cloud-based computing instances 186 in the second zone 150. In several embodiments, to reserve the amount of cloud-based computing instances 186, the cloud server 130 can generate a capacity reservation request to reserve the amount of cloud-based computing instances 186 in the second zone 150 and transmit the request to a capacity reservation service of the cloud-based computing system.

Optionally, in several embodiments, the set of applications can be a first set of applications, the simulated usage capacity can be a first simulated usage capacity, and to determine the first simulated usage capacity at operation 202, the cloud server 130 can determine the first simulated usage capacity of the first set of applications executing in the first zone 140 at a first time. One or more optional operations can operate to allow the cloud server 130 to determine a second simulated usage capacity of a second set of applications (e.g., applications 144) executing in the first zone 140 at a second time later than the first time. The cloud server 130 can further determine an amount of cloud-based computing instances 188 in the second zone 150 needed to maintain the first simulated usage capacity and the second simulated usage capacity in the event of the failover of the first zone 140. Subsequently, the cloud server 130 can reserve the second amount of cloud-based computing instances 188 in the second zone 150. In several embodiments, the amount of cloud-based computing instances 188 can be less than the amount of cloud-based computing instances 186.

Figure 3:
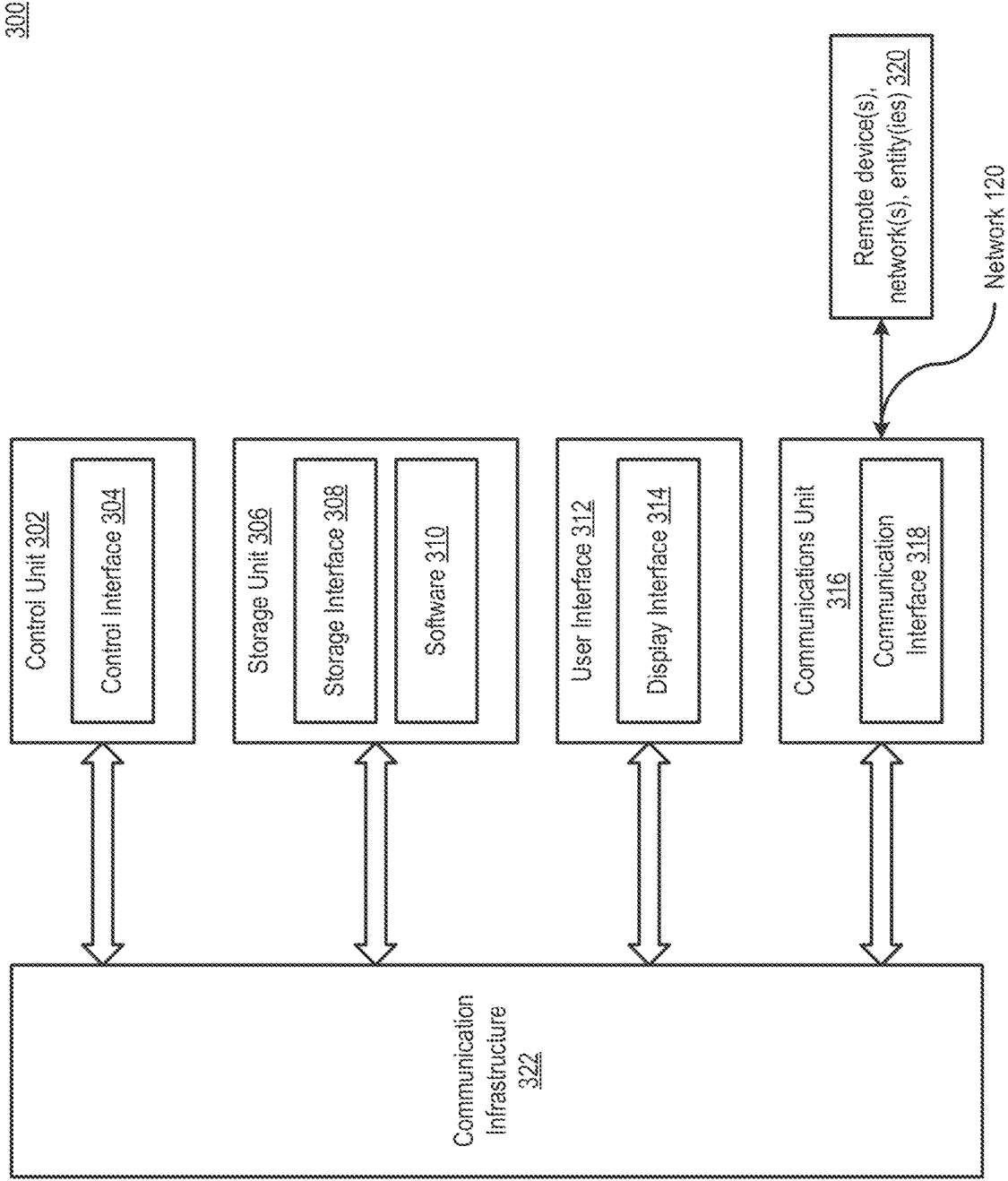
FIG. 3 illustrates an example architecture of components implementing an example system for leveraging machine learning to automate capacity reservations for application failover in a cloud-based computing system according to several embodiments.

FIG. 3 is an architecture 300 of components implementing the system 100 according to some embodiments. The components can be implemented by any of the devices described with reference to the system 100, such as the client device 110, the client device 160, the cloud server 130, the first zone 140, the second zone 150, or a combination thereof. The components can be further implemented by any of the devices, structures, or functional units described with reference to the method 200.

In several embodiments, the components can include a control unit 302, a storage unit 306, a communication unit 316, and a user interface 312. The control unit 302 can include a control interface 304. The control unit 302 can execute a software 310 (e.g., the application 112, the authentication module 114, the application 162, the authentication module 164, the authentication service 132, or a combination thereof) to provide some or all of the machine intelligence described with reference to system 100. In another example, the control unit 302 can execute a software 310 to provide some or all of the machine intelligence described with reference to method 200.

The control unit 302 can be implemented in a number of different ways. For example, the control unit 302 can be, or include, a processor, an application specific integrated circuit (ASIC), an embedded processor, a microprocessor, a hardware control logic, a hardware finite state machine (FSM), a digital signal processor (DSP), a field programmable gate array (FPGA), or a combination thereof.

The control interface 304 can be used for communication between the control unit 302 and other functional units or devices of system 100 (e.g., the client device 110, the client device 160, the cloud server 130, the first zone 140, the second zone 150, or a combination thereof). The control interface 304 can also be used for communication that is external to the functional units or devices of system 100. The control interface 304 can receive information from the functional units or devices of system 100, or from remote devices 320, or can transmit information to the functional units or devices of system 100, or to remote devices 320. The remote devices 320 refer to units or devices external to system 100.

The control interface 304 can be implemented in different ways and can include different implementations depending on which functional units or devices of system 100 or remote devices 320 are being interfaced with the control unit 302. For example, the control interface 304 can be implemented with a pressure sensor, an inertial sensor, a microelectromechanical system (MEMS), optical circuitry, waveguides, wireless circuitry, wireline circuitry to attach to a bus, an application programming interface, or a combination thereof. The control interface 304 can be connected to a communication infrastructure 322, such as a bus, to interface with the functional units or devices of system 100 or remote devices 320.

The storage unit 306 can store the software 310. For illustrative purposes, the storage unit 306 is shown as a single element, although it is understood that the storage unit 306 can be a distribution of storage elements. Also for illustrative purposes, the storage unit 306 is shown as a single hierarchy storage system, although it is understood that the storage unit 306 can be in a different configuration. For example, the storage unit 306 can be formed with different storage technologies forming a memory hierarchical system including different levels of caching, main memory, rotating media, or off-line storage. The storage unit 306 can be a volatile memory, a nonvolatile memory, an internal memory, an external memory, or a combination thereof. For example, the storage unit 306 can be a nonvolatile storage such as nonvolatile random access memory (NVRAM), Flash memory, disk storage, or a volatile storage such as static random access memory (SRAM) or dynamic random access memory (DRAM).

The storage unit 306 can include a storage interface 308. The storage interface 308 can be used for communication between the storage unit 306 and other functional units or devices of system 100. The storage interface 308 can also be used for communication that is external to system 100. The storage interface 308 can receive information from the other functional units or devices of system 100, or from remote devices 320, or can transmit information to the other functional units or devices of system 100 or to remote devices 320. The storage interface 308 can include different implementations depending on which functional units or devices of system 100 or remote devices 320 are being interfaced with the storage unit 306. The storage interface 308 can be implemented with technologies and techniques similar to the implementation of the control interface 304.

The communication unit 316 can enable communication to devices, components, modules, or units of system 100 or remote devices 320. For example, the communication unit 316 can permit the system 100 to communicate between the client device 110, the client device 160, the cloud server 130, the first zone 140, the second zone 150, or a combination thereof. The communication unit 316 can further permit the devices of system 100 to communicate with remote devices 320 such as an attachment, a peripheral device, or a combination thereof through the network 120.

As previously indicated, the network 120 can span and represent a variety of networks and network topologies. For example, the network 120 can include wireless communication, wired communication, optical communication, ultrasonic communication, or a combination thereof. For example, satellite communication, cellular communication, Bluetooth, IrDA, Wi-Fi, and WiMAX are examples of wireless communication that can be included in the network 120. Cable, Ethernet, DSL, fiber optic lines, FTTH, and POTS are examples of wired communication that can be included in the network 120. Further, the network 120 can traverse a number of network topologies and distances. For example, the network 120 can include direct connection, PAN, LAN, MAN, WAN, or a combination thereof.

The communication unit 316 can also function as a communication hub allowing system 100 to function as part of the network 120 and not be limited to be an end point or terminal unit to the network 120. The communication unit 316 can include active and passive components, such as microelectronics or an antenna, for interaction with the network 120.

The communication unit 316 can include a communication interface 318. The communication interface 318 can be used for communication between the communication unit 316 and other functional units or devices of system 100 or to remote devices 320. The communication interface 318 can receive information from the functional units or devices of system 100 or from the remote devices 320, transmit information to the other functional units or devices of the system 100 or to remote devices 320, or both. The communication interface 318 can include different implementations depending on which functional units or devices are being interfaced with the communication unit 316. The communication interface 318 can be implemented with technologies and techniques similar to the implementation of the control interface 304.

The user interface 312 can present information generated by system 100. In several embodiments, the user interface 312 allows a user to interface with the devices of system 100 or remote devices 320. The user interface 312 can include an input device and an output device. Examples of the input device of the user interface 312 can include a keypad, buttons, switches, touchpads, soft-keys, a keyboard, a mouse, or any combination thereof to provide data and communication inputs. Examples of the output device can include a display interface 314. The control unit 302 can operate the user interface 312 to present information generated by system 100. The control unit 302 can also execute the software 310 to present information generated by system 100, or to control other functional units of system 100. The display interface 314 can be any graphical user interface such as a display, a projector, a video screen, or any combination thereof.

Having described some example embodiments in general terms, the following example embodiments are provided to further illustrate an example use case of some example embodiments. In some instances, the following example embodiments provide examples of how the systems disclosed herein may leverage machine learning to automatically reserve cloud-based computing instances in a cloud-based computing system for use in the event of application failover.

"On-demand capacity reservations (ODCR) simulator" is an illustrative example use case wherein the systems disclosed herein use an ODCR linear regression ML technique to determine the ODCRs required for application failover in AWS™. ODCR is a service offered by AWS™ to reserve compute capacity for Amazon elastic compute cloud (EC2) instances in a specific availability zone for any duration, ensuring the availability of the instances whenever it is needed.

The ODCR simulator can utilize an ODCR ML model to perform the data analysis on an enterprise's current EC2 fleet, observing the trends of the various EC2 instance types in all of the AWS virtual private cloud (VPC) accounts and availability zones to estimate the amount of ODCRs needed to protect the system from the impact of a catastrophic failure, such as a power loss, within any of those availability zones or their regions. The ODCR simulator can enrich the estimate and other data provided by the ODCR ML model and feed that data into an automation workflow to modify and align the ODCRs. In one example, the ODCR simulator can determine a set of instance types (e.g., EC2 instance types such as Mac, T4g, T3, T3a, T2, M6g, M6i, M5, M5a, M5n, M5zn, M4, A1, C6g, C6gn, C5, C5a, C5n, C4, R6g, R5, R5a, R5b, R5n, R4, X2gd, X1e, X1, high memory, z1d, P4, P3, P2, Inf1, G4dn, G4ad, G3, F1, VT1, I3, I3en, D2, D3, D3en, H1, etc.), a set of computing platforms (e.g., Amazon Linux, Ubuntu, Windows Server, Red Hat Enterprise Linux, SUSE Linux Enterprise Server, openSUSE Leap, Fedora, Fedora CoreOS, Debian, CentOS, Gentoo Linux, Oracle Linux, and FreeBSD, etc.), and a set of availability zones of the amount of cloud-based computing instances. The ODCR simulator can then determine a simulated usage capacity based on the amount of cloud-based computing instances, the set of instance types, the set of computing platforms, and the set of availability zones.

Figure 4A:
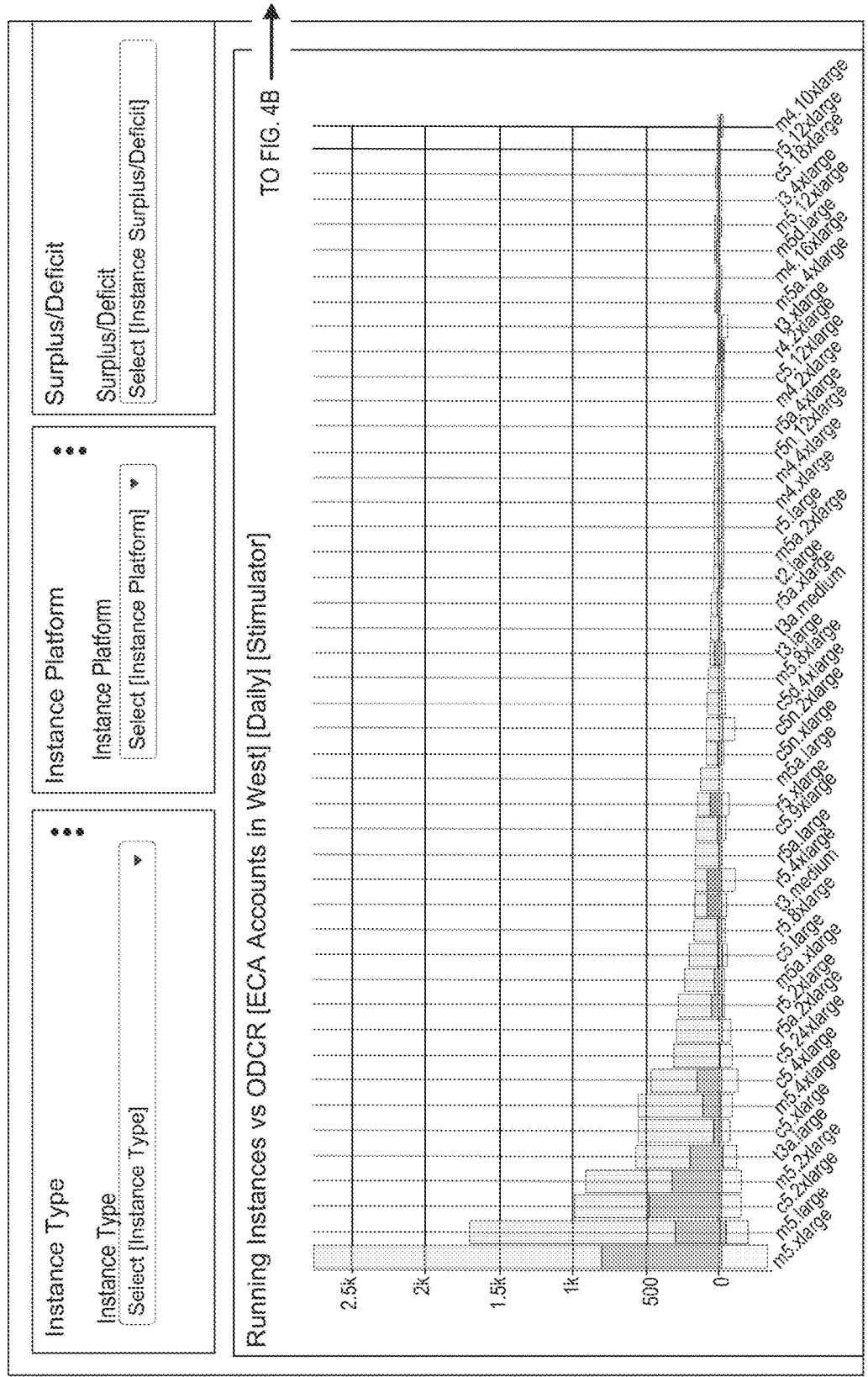
FIGS. 4A and 4B illustrate portions of an example dashboard generated by an example capacity reservation simulator according to some embodiments.
Figure 4B:
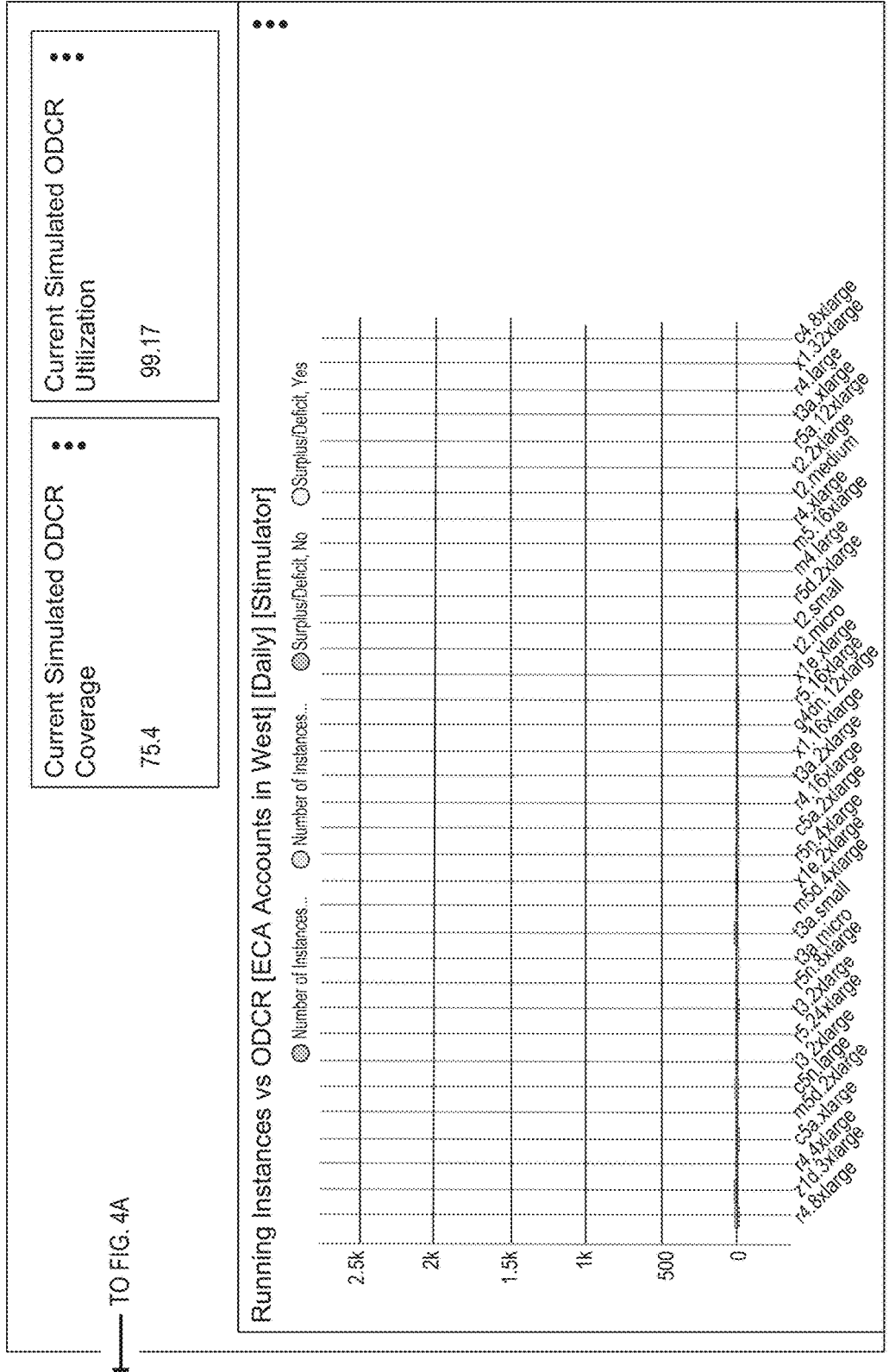

FIGS. 4A and 4B illustrate example ODCR simulator dashboard 400 produced by an example ODCR simulator. As shown in FIGS. 4A and 4B, the example ODCR simulator dashboard 400 provides visualizations that illustrate the effects of ODCR modifications against multiple EC2 instance types. As shown in FIG. 4B, the ODCR simulator has resulted in expanding the current simulated ODCR coverage about 75.4% and improving the current simulated ODCR utilization to 99.07%.

Figure 5:
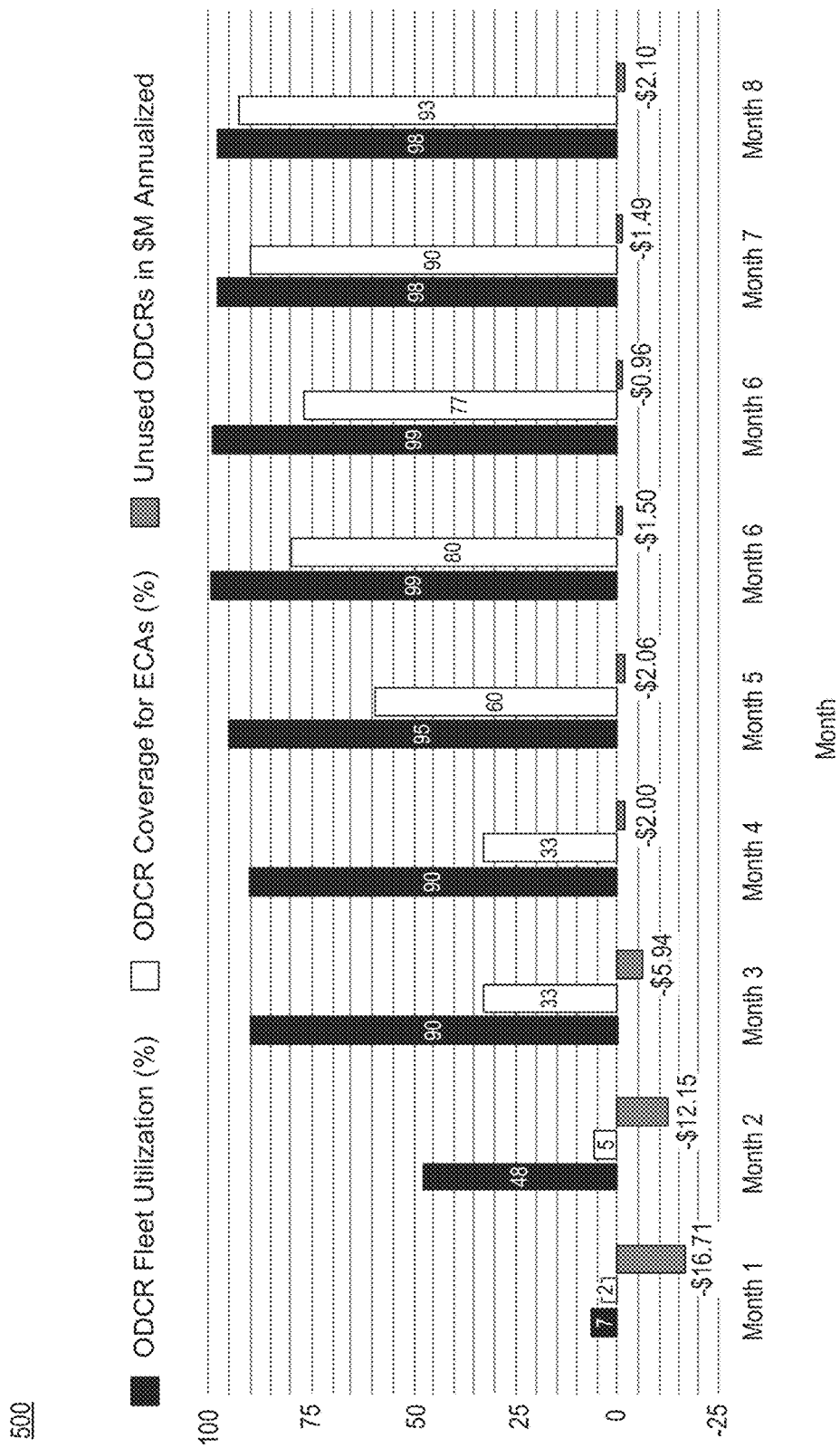
FIG. 5 illustrates example metrics generated by an example capacity reservation simulator according to some embodiments.

FIG. 5 includes a chart 500 that illustrates example coverage and utilization metrics generated by the example ODCR simulator. As shown in FIG. 5, the ODCR simulator, using the ODCR ML model, has produced a trend of increasing utilization, coverage, and savings since it began simulating and automating ODCRs in about Month 1. For instance, the chart 500 shows that the ODCR simulator, using the ODCR ML model, has resulted in expanding the coverage from about 7% in Month 1 to about 98% in Month 8 and improving the utilization of the ODCRs from about 2% in Month 1 to about 93% in Month 8 for the applications running in AWS™.

The above detailed description and embodiments of the disclosed systems and methods are not intended to be exhaustive or to limit the disclosed systems or methods to the precise form disclosed above. For instance, while specific examples for the system 100 are described above for illustrative purposes, various equivalent modifications are possible within the scope of the system 100, as those skilled in the relevant art will recognize. Additionally, while processes and methods are presented in a given order, alternative implementations can perform routines having steps, or employ systems having processes or methods, in a different order, and some processes or methods can be deleted, moved, added, subdivided, combined, or modified to provide alternative or sub-combinations. Each of these processes or methods can be implemented in a variety of different ways. Also, while processes or methods are at times shown as being performed in series, these processes or blocks can instead be performed or implemented in parallel, or can be performed at different times.

The embodiments of the present disclosure, such as the system 100, are cost-effective, highly versatile, and accurate, and can be implemented by adapting components for ready, efficient, and economical manufacturing, application, and utilization. Another important aspect of the embodiments of the present disclosure is that they valuably support and service the trend of reducing costs, simplifying systems, and/or increasing system performance.

These and other valuable aspects of the embodiments of the present disclosure consequently further the state of the technology to at least the next level. While the disclosed embodiments have been described as the best mode of implementing the system 100, it is to be understood that many alternatives, modifications, and variations will be apparent to those skilled in the art in light of the descriptions herein. Accordingly, it is intended to embrace all such alternatives, modifications, and variations that fall within the scope of the included claims. All matters set forth herein or shown in the accompanying drawings are to be interpreted in an illustrative and non-limiting sense. Accordingly, the disclosure is not to be restricted except in light of the attached claims and their equivalents.

What is claimed is:

1. A computer-implemented method for adaptive reserving of computing instances in a cloud-based computing system, the computer-implemented method comprising:
   determining, by one or more computing devices, a first simulated usage capacity of a first set of applications executing in a first zone of the cloud-based computing system at an initial time using a machine learning model;
   determining, by the one or more computing devices, a first amount of cloud-based computing instances in a second zone of the cloud-based computing system needed to maintain the first simulated usage capacity in an event of a failover of the first zone;
   determining, by the one or more computing devices, a second simulated usage capacity of a second set of applications executing in the first zone at a later time than the initial time using the machine learning model, wherein the second set of applications is different from the first set of applications;
   determining, by the one or more computing devices, a second amount of cloud-based computing instances in the second zone needed to maintain the first and second simulated usage capacities in the event of a failover of the first zone;
   reserving, by the one or more computing devices, the second amount of cloud-based computing instances in the second zone when the second amount is less than the first amount; and
   dynamically modifying the reserved second amount of cloud-based computing instances in the second zone when the reserved amount does not align with current data trends continuously provided from the machine learning model.

2. The computer-implemented method of claim 1, wherein the reserving comprises generating, by the one or more computing devices, a capacity reservation request to reserve the second amount of cloud-based computing instances in the second zone.

3. The computer-implemented method of claim 2, wherein the reserving further comprises transmitting, by the one or more computing devices, the request to a capacity reservation service of the cloud-based computing system.

4. The computer-implemented method of claim 1, wherein:
the first zone is distributed across a first geographic region; and
the second zone is distributed across a second geographic region different from the first geographic region.

5. The computer-implemented method of claim 1, wherein further comprising:
reserving, by the one or more computing devices, the first amount of cloud-based computing instances in the second zone.

6. A non-transitory computer readable medium including instructions for causing a processor to perform operations for adaptive reserving of computing instances in a cloud-based computing system, the operations comprising:
determining a first simulated usage capacity of a first set of applications executing in a first zone of the cloud-based computing system at an initial time using a machine learning model;
determining a first amount of cloud-based computing instances in a second zone of the cloud-based computing system needed to maintain the first simulated usage capacity in an event of a failover of the first zone;
determining a second simulated usage capacity of a second set of applications executing in the first zone at a later time than the initial time using the machine learning model, wherein the second set of applications is different from the first set of applications;
determining a second amount of cloud-based computing instances in the second zone needed to maintain the first and second simulated usage capacities in the event of a failover of the first zone;
reserving the second amount of cloud-based computing instances in the second zone when the second amount is less than the first amount; and
dynamically modifying the reserved second amount of cloud-based computing instances in the second zone when the reserved amount does not align with current data trends continuously provided from the machine learning model.

7. The non-transitory computer readable medium of claim 6, wherein to perform the reserving, the operations comprise generating a capacity reservation request to reserve the second amount of cloud-based computing instances in the second zone.

8. The non-transitory computer readable medium of claim 6, wherein to perform the reserving, the operations further comprise transmitting the request to a capacity reservation service of the cloud-based computing system.

9. The non-transitory computer readable medium of claim 6, wherein:
the first zone is distributed across a first geographic region; and
the second zone is distributed across a second geographic region different from the first geographic region.

10. The non-transitory computer readable medium of claim 6, further comprising:
reserving the first amount of cloud-based computing instances in the second zone.

11. A computing system for adaptive reserving of computing instances in a cloud-based computing system, comprising:
one or more memories;
at least one processor coupled to the one or more memories and configured to perform operations comprising:
determining a first simulated usage capacity of a first set of applications executed in a first zone of the cloud-based computing system at an initial time using a machine learning model;
determining a first amount of cloud-based computing instances in a second zone of the cloud-based computing system needed to maintain the first simulated usage capacity in an event of a failover of the first zone;
determining a second simulated usage capacity of a second set of applications executing in the first zone at a later time than the initial time using the machine learning model, wherein the second set of applications is different from the first set of applications;
determining a second amount of cloud-based computing instances in the second zone needed to maintain the first and second simulated usage capacities in the event of a failover of the first zone;
reserving the second amount of cloud-based computing instances in the second zone when the second amount is less than the first amount; and
dynamically modifying the reserved second amount of cloud-based computing instances in the second zone when the reserved amount does not align with current data trends continuously provided from the machine learning model.

12. The computing system of claim 11, wherein to perform the reserving, the operations comprise generating a capacity reservation request to reserve the second amount of cloud-based computing instances in the second zone.

13. The computing system of claim 11, wherein to perform the reserving, the operations further comprise transmitting the request to a capacity reservation service of the cloud-based computing system.

14. The computing system of claim 11, wherein:
the first zone is distributed across a first geographic region; and
the second zone is distributed across a second geographic region different from the first geographic region.

15. The computing system of claim 11, further comprising:
reserving the first amount of cloud-based computing instances in the second zone.

* * * * *